(12) United States Patent
Lu et al.

(10) Patent No.: US 9,504,901 B1
(45) Date of Patent: Nov. 29, 2016

(54) SYSTEM AND METHOD FOR A FOLDING SKATEBOARD WITH HANDS FREE FOLDING OPERATION

(71) Applicants: Bin Lu, Saratoga, CA (US); Alan Lu, Saratoga, CA (US)

(72) Inventors: Bin Lu, Saratoga, CA (US); Alan Lu, Saratoga, CA (US)

(*) Notice: Subject to any disclaimer, the term of this patent is extended or adjusted under 35 U.S.C. 154(b) by 0 days.

(21) Appl. No.: 14/726,480

(22) Filed: May 30, 2015

(51) Int. Cl.
| | | |
|---|---|---|
| A63C 17/01 | (2006.01) |
| A63C 11/02 | (2006.01) |
| A63C 17/26 | (2006.01) |
| B62K 15/00 | (2006.01) |
| B62K 3/00 | (2006.01) |

(52) U.S. Cl.
CPC ............ *A63C 17/017* (2013.01); *A63C 11/028* (2013.01); *A63C 17/01* (2013.01); *A63C 17/012* (2013.01); *A63C 17/015* (2013.01); *A63C 17/265* (2013.01); *A63C 2203/10* (2013.01); *A63C 2203/42* (2013.01); *B62K 3/002* (2013.01); *B62K 15/00* (2013.01); *B62K 15/006* (2013.01)

(58) Field of Classification Search
None
See application file for complete search history.

(56) References Cited

U.S. PATENT DOCUMENTS

| | | | |
|---|---|---|---|
| 6,131,931 A | 10/2000 | Globerson et al. | |
| 6,270,097 B1 | 8/2001 | Lin | |
| D505,470 S * | 5/2005 | Hong | D21/765 |
| 7,063,341 B2 | 6/2006 | Tsai | |
| 7,150,461 B2 | 12/2006 | Schnuckle et al. | |
| 7,976,034 B1 * | 7/2011 | Hong | A63C 17/01 280/87.042 |
| 8,459,670 B1 * | 6/2013 | Tizzone | A63C 17/015 280/87.042 |
| 9,095,766 B1 * | 8/2015 | Christie | A63C 17/01 |
| 2005/0212246 A1 * | 9/2005 | Hong | A63C 17/01 280/87.042 |
| 2011/0236607 A1 * | 9/2011 | Woncik | A63C 17/0006 428/12 |
| 2012/0068427 A1 * | 3/2012 | Alva | A63C 17/015 280/87.05 |
| 2014/0138937 A1 * | 5/2014 | Woncik | A63C 17/0006 280/639 |

FOREIGN PATENT DOCUMENTS

AU WO 2014197927 A1 * 12/2014 ............ A63C 17/012

* cited by examiner

*Primary Examiner* — Katy M Ebner
*Assistant Examiner* — Hilary L Johns
(74) *Attorney, Agent, or Firm* — Robert Brownstein

(57) ABSTRACT

The system and method invention herein disclosed and claimed is a folding skateboard. It can be folded while at rest, on the ground, by applying pressure to one end as the bi-folding deck portions pivot toward one another and come to rest in a fully folded position.

7 Claims, 9 Drawing Sheets

SYSTEM AND METHOD FOR A FOLDING SKATEBOARD WITH HANDS FREE FOLDING OPERATION

TECHNICAL FIELD

This invention is associated with skateboards, and specifically, a skateboard that can be folded and unfolded.

BACKGROUND OF THE INVENTION

Skateboards are wheeled platforms typically less than 12 inches wide and less than 33 inches long, however so-called long-board types are usually longer than 33 inches. Sets of wheels and wheel mounting structures (called "trucks") are placed on one surface of a rigid platform, called a deck, and oriented such that the deck will roll on the attached wheels in a direction essentially parallel to its side edges. Placed so that the wheels contact the ground, a user stands on the opposite surface of the deck and using a scooter-like one-footed propelling motion, or gravitational force on sloping ground, the user is transported along with skateboard in an intended path.

Whereas many skateboard riders use the skateboard for recreational purposes, an increasing number of skateboard owners use them for transportation. For example, someone located some blocks from a bus stop, may use a skateboard to travel to the bus stop, then board the bus with the skateboard in hand.

A skateboard with a solid, rigid deck is a device that can be nearly three feet long and weigh ten pounds or more. Clearly, riding a public transportation vehicle with a skateboard in hand can create a nuisance situation for other riders. Placing the skateboard on the floor or under a seat is not safe because the skateboard can be propelled by inertia when a vehicle starts or stops.

A skateboard that could be folded and carried in a backpack could eliminate the need to hand hold the board or place it somewhere where it can roll unintentionally. However, a folding process that involves several steps and places hands or fingers in places where they may be injured makes foldable skateboards less appealing.

A folding skateboard that could be folded without requiring the use of hands or fingers could be both safer to use, faster to fold, and more convenient.

BRIEF SUMMARY OF THE INVENTION

The invention disclosed and claimed herein is a folding skateboard and a method for folding it without using hands or fingers. The folding skateboard folds essentially in half lengthwise. When folded, the deck comprises two deck portions that can pivot around a hinging means located essentially half way from the deck ends and oriented essentially perpendicular to the two deck edges. When folded, the wheels of each portion press against the bottom surface of the other portion. The surfaces of the two portions are essentially parallel. The hinging means can be one or a plurality of butt hinges aligned perpendicular to the deck edges. The butt hinge leaves are mortised and attached to the mating edges of the deck portions such that when fully unfolded, the leaves press against each other creating support and keeping the portions aligned in an essentially coplanar orientation. The pin upon which the leaves rotate is located below the bottom of the deck such that when folded, the deck portions will be essentially parallel to one another. A locking mechanism locks the hinge into its unfolded position so that the coplanar orientation is preserved even if the wheels are rolling on an uneven surface. For all intents and purposes, the unfolded skateboard will have essentially the same ride feel and deck integrity of a non-folding skateboard.

The method for folding the skateboard is employed when the board is at rest and the wheels are in contact with the ground. A sharp press by a foot, for example, on one edge of the deck will cause the opposite end of the deck to rotate upward as the wheels nearest the foot act as a fulcrum. As the still unfolded board rotates up, an unlocking actuator unlocks the hinge, and an end fulcrum structure, located below the bottom surface near the rear end of the deck, contacts the ground and becomes the new fulcrum. The rear wheels now also rotate up from the ground surface. Simultaneously, the unlocked hinge allows the front deck portion to rotate downward around the butt hinge rod until the front wheels contact the ground. The force of gravity and momentum will cause the two deck portions to fold with the wheels contacting the opposite deck portion's bottom surface. Alternatively, if the unlocking actuator unlocks the hinge while the deck is fully extended, then pressure applied to one end will cause the mating ends of both deck portions to rise but the wheels of the opposing section would remain in contact with the ground surface and allow that opposing section's end to move toward the section being pressed. Momentum will cause the two deck portions to fold, as before. A torsion spring-like mechanism may be incorporated in the butt hinge operative to slow down the speed of folding or unfolding, or to place the deck portions during folding or unfolding into a mid-range position, with hinge leaves essentially oriented 90 degrees from one another. In such embodiments, further folding or unfolding is prompted by either pulling up on the handle (e.g. for folding) or pushing down on the handle (e.g. unfolding). This alternative embodiment would also serve to protect users from pinched extremities because the hinge does not allow the deck portions to fully unfold in one motion.

A handle which was flush with the top surface, or below the top surface. of the deck portions when unfolded will now be aligned in an essentially vertical position. The handle provides a convenient means for lifting and stowing the folded skateboard. In the case where a spring mechanism is used to slow down or position the deck portions into an essentially half folded or unfolded state, lifting the handle to pull the skateboard off the ground surface will allow the deck portions to fully fold. Similarly, pushing down on the handle will complete the unfolding process such that the skateboard becomes fully extended and locked.

The method for unfolding the skateboard is to, while holding the handle, allow the folded board to come to rest on the ground surface. Then, using the toe portion of a shoe, one inserts it between the folded portions, near the ground surface, and turns the toe portion such that it causes the folded portion ends to separate while allowing the skateboard portions to roll on their wheels away from one another until the skateboard is fully extended, the surfaces are coplanar, and the locking device locks the hinge into the unfolded fully extended position.

An alternative method for unfolding would apply pressure on the handle pushing it at an angle downward and toward the opposite deck portion. That would also cause the bottom ends of the two deck portions to move away from one another and allow the deck portions to collapse into the locked and fully unfolded position. A handle with a curvilinear shaped shaft could be used instead of the linear handle. It would extend below the deck when unfolded, and slip through a keyway when folded so as to enable one to lift the folded skateboard up after folding. Its curvilinear shape would facilitate unfolding because downward pressure on the handle would produce some force components in a direction conducive to deck portion separation.

BRIEF DESCRIPTIONS OF THE DRAWINGS

Figure 3A:
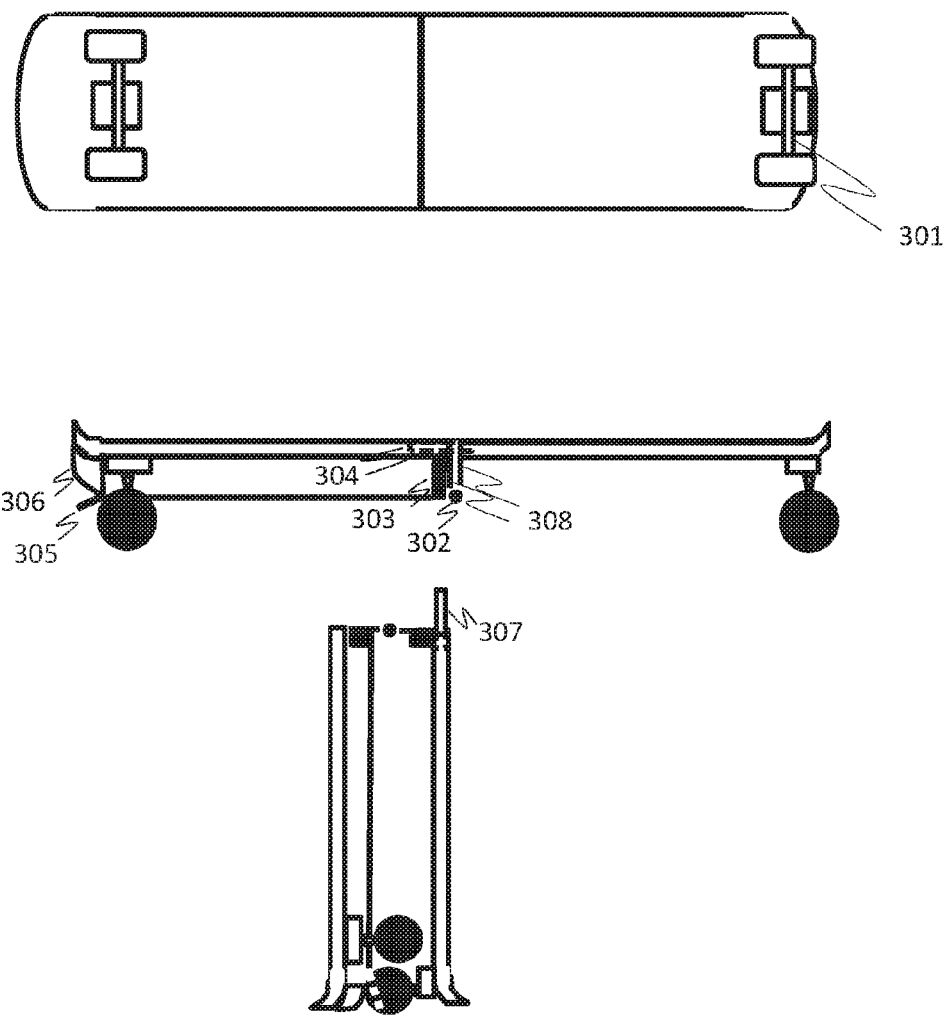
Figure 3B:
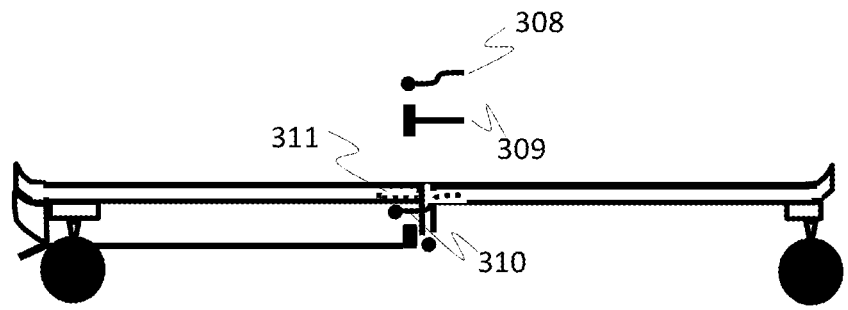
Figure 3B:
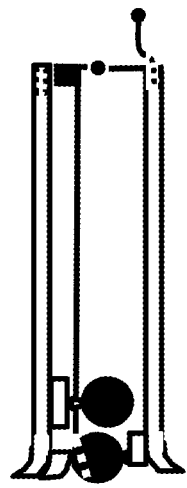

FIG. 3 A depicts one embodiment of the invention, a bi-folding skateboard, operative to fold by pressing down with one's foot on the rear edge of the deck. The handle shown in FIG. 3A rests flush with the surface of the fully unfolded deck portion. FIG. 3B depicts another embodiment of the invention, a bi-folding skateboard, operative to fold by pressing down with one's foot on the rear edge of the deck. The handle shown in 3B passes through a keyway of one deck portion, when the skateboard is fully unfolded, and resides below the deck portion.

Figure 4:
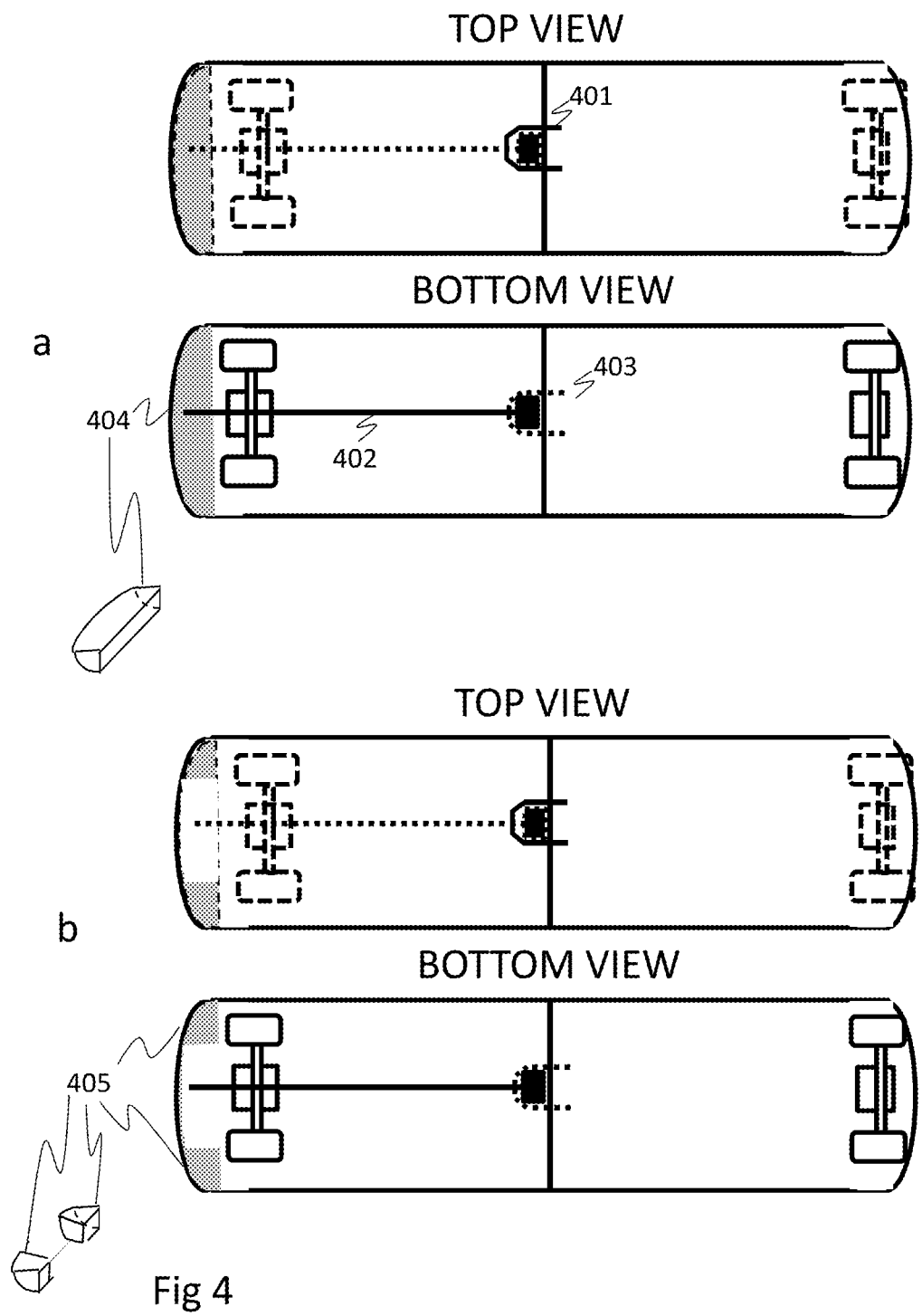

FIG. 4 illustrates the top and bottom views of the embodiment of FIG. 3A.

Figure 5:
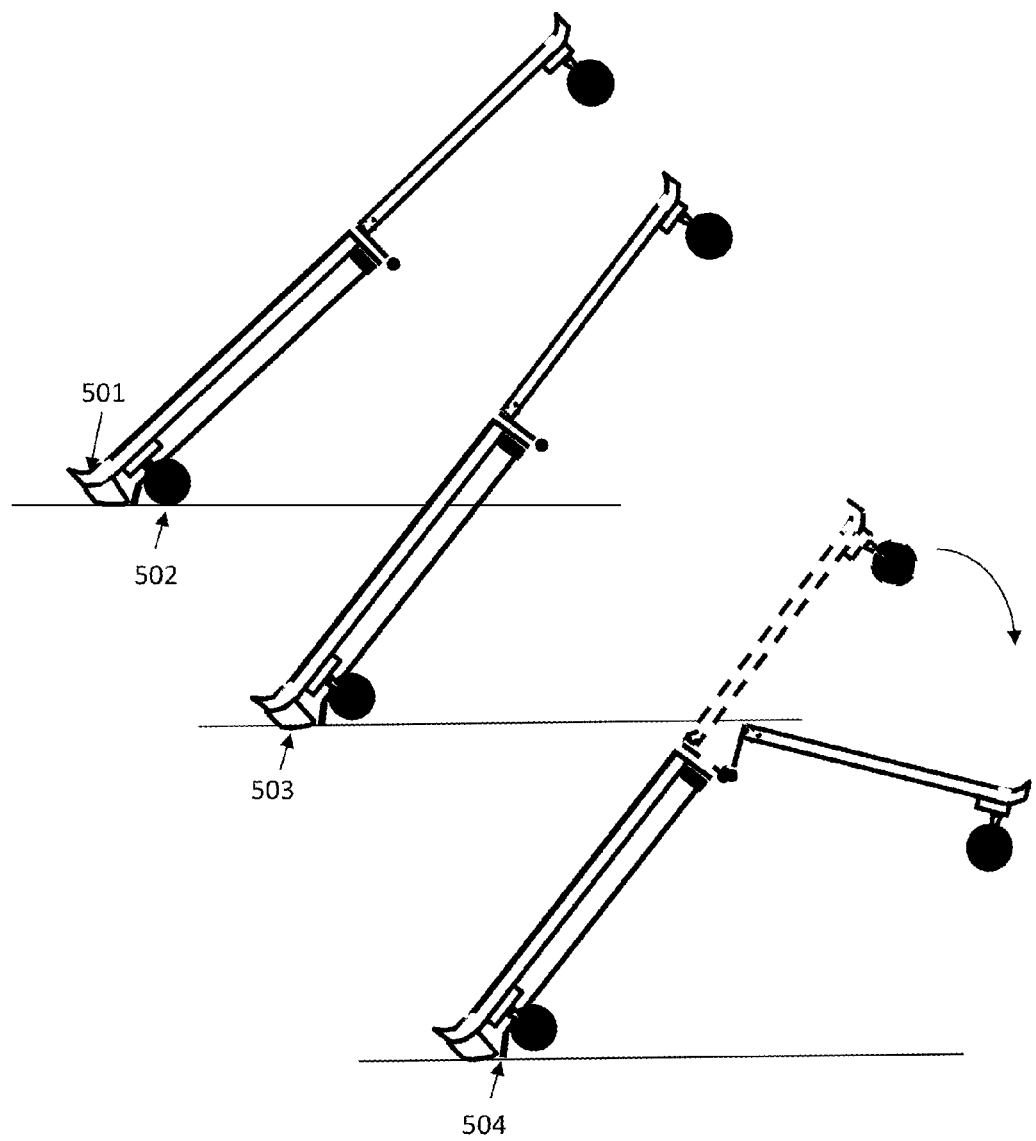

FIG. 5 illustrates how the embodiment device of FIG. 3 A can be folded starting from the locked unfolded state.

Figure 6:
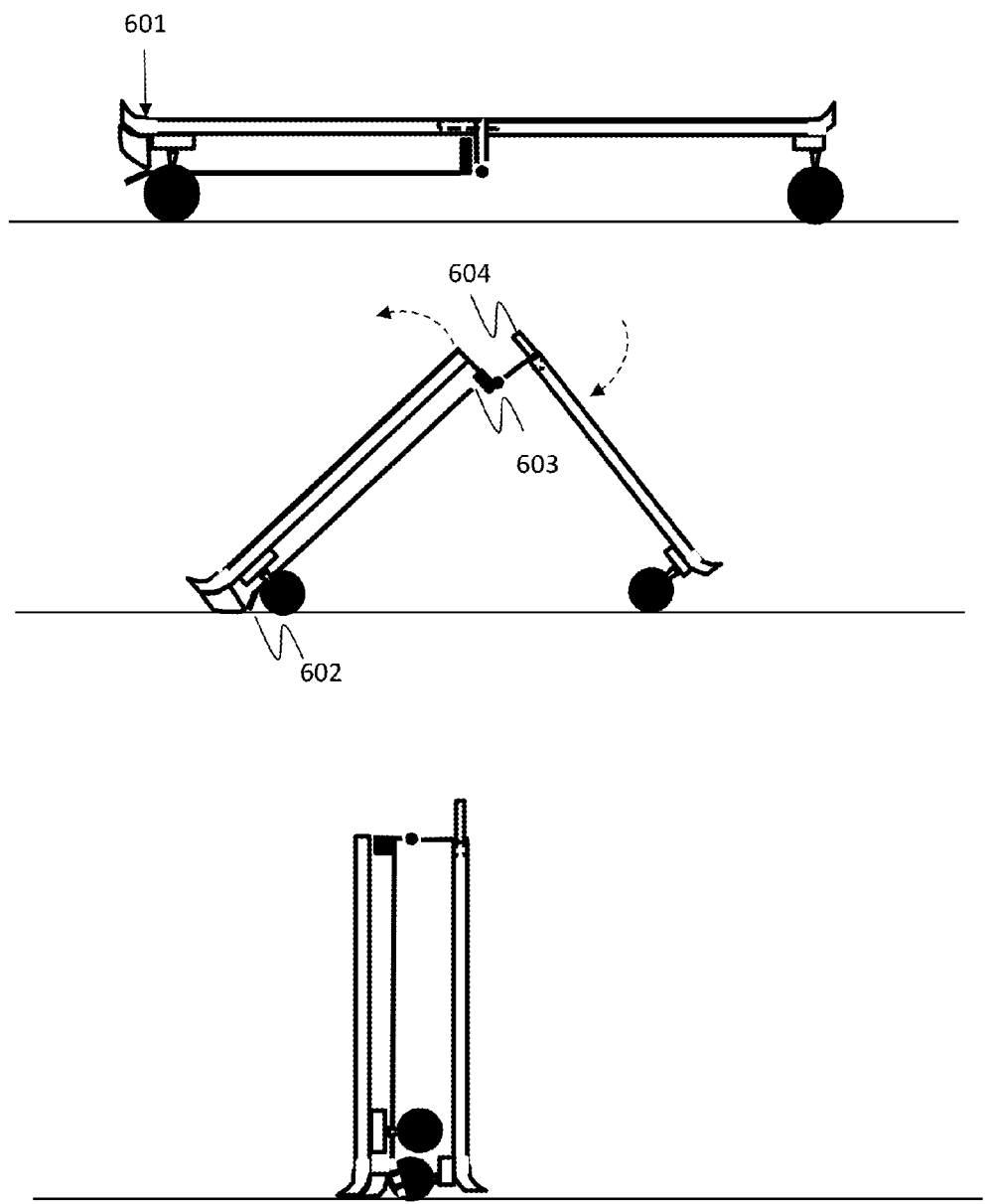

FIG. 6 illustrates the complete folding of the embodiment of FIG. 3A beginning from a fully extended, unfolded state, and ending in a folded state.

Figure 7:
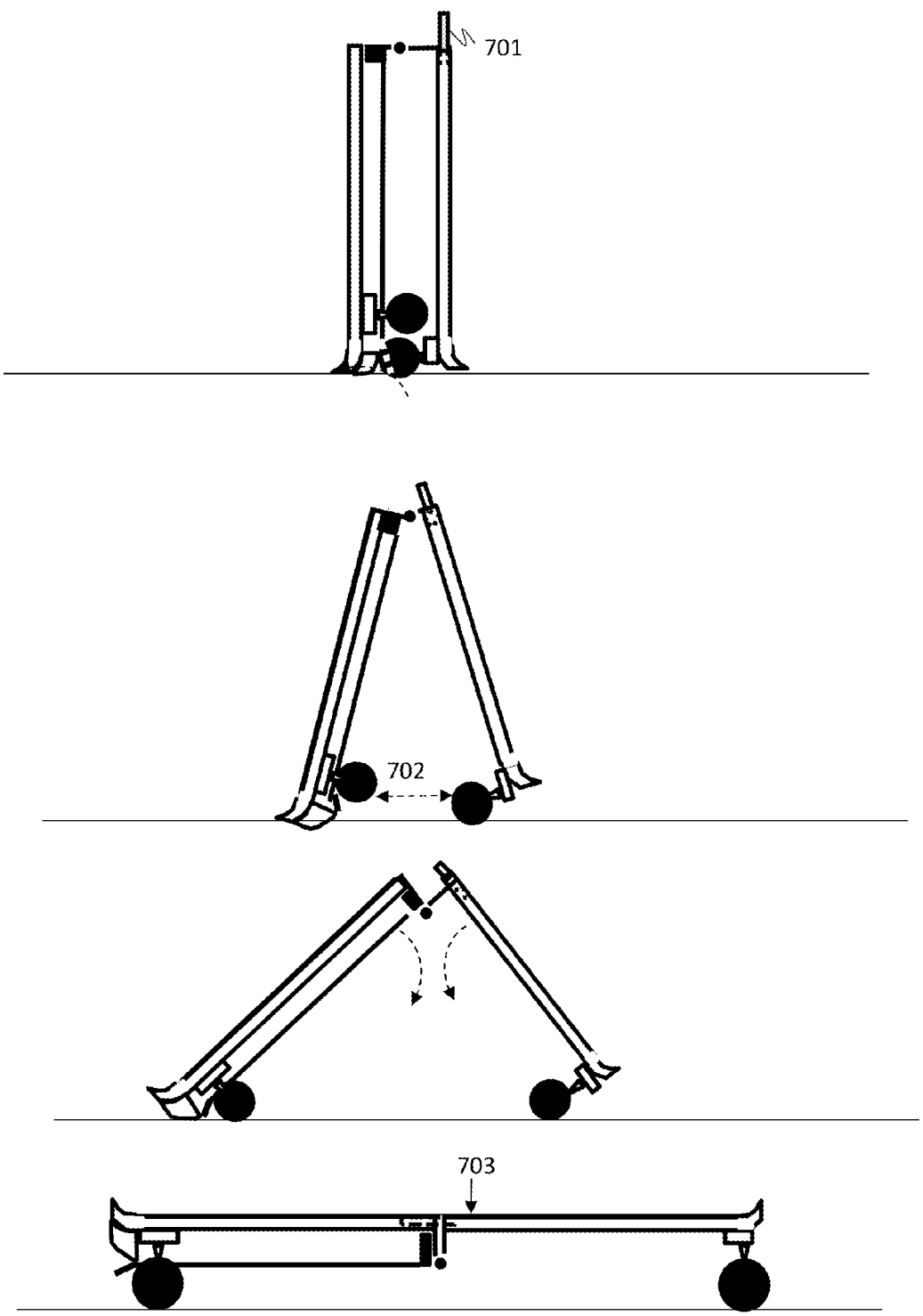

FIG. 7 illustrates a complete unfolding of the embodiment of FIG. 3A beginning from a fully folded state and ending in a fully extended, locked, unfolded state.

Figure 8:
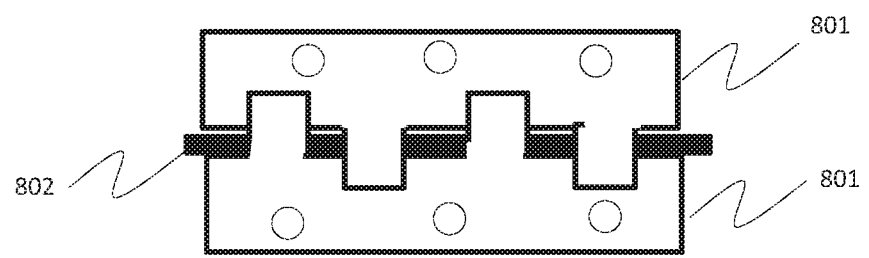

FIG. 8 illustrates a butt hinge including the leaves and pin.

DETAILED DESCRIPTION OF THE INVENTION

Skateboards and skateboarding began as a primarily recreational activity.

Figure 1:
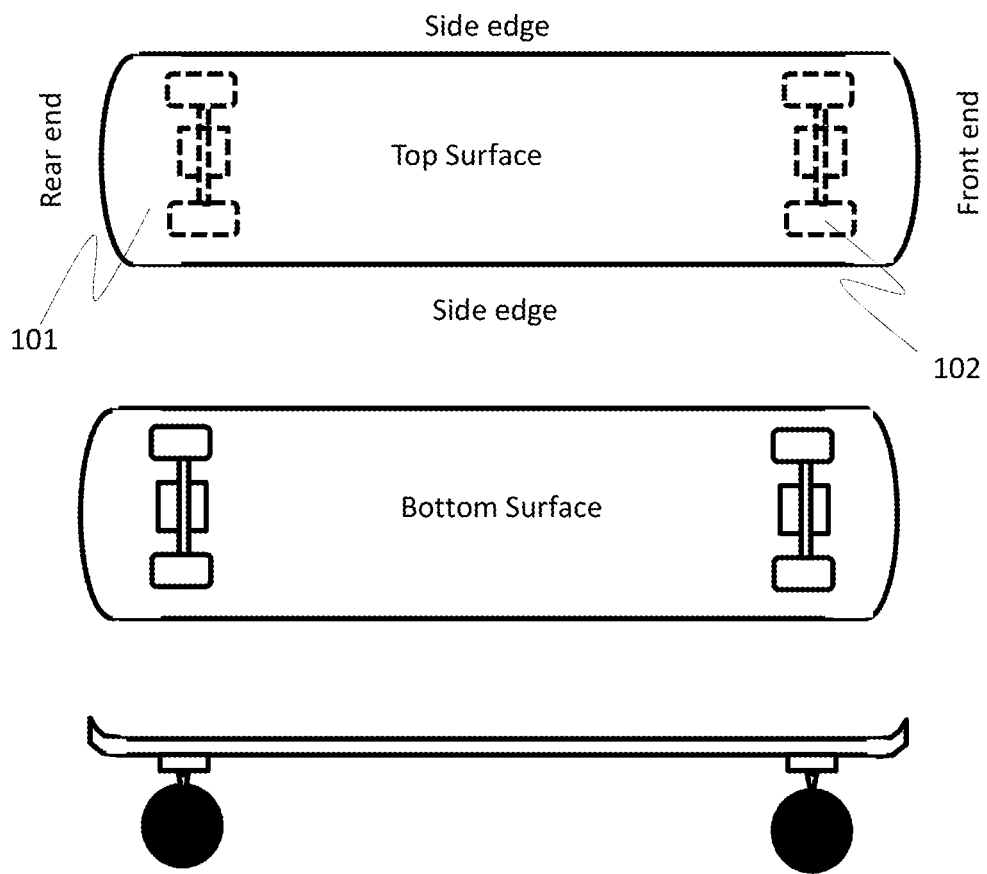
FIG. 1 depicts a conventional skateboard. This is prior art.

As shown in FIG. 1, a typical skateboard has a rigid deck upon which the user stands. The deck has a top surface, bottom surface, side edges, and front and rear ends. On the bottom surface, wheels and wheel mounting structures are located near the rear end (101) and front end (102). Skateboards vary in size but typical width is less than 12 inches and typical length, from front to rear end, is 33 inches or less. The weight of deck, wheels and wheel mounting structures may be 10 pounds or more. Because, like an automobile, the larger the wheel base, the more stable the ride, some skateboards are made longer than the typical length.

Figure 2:
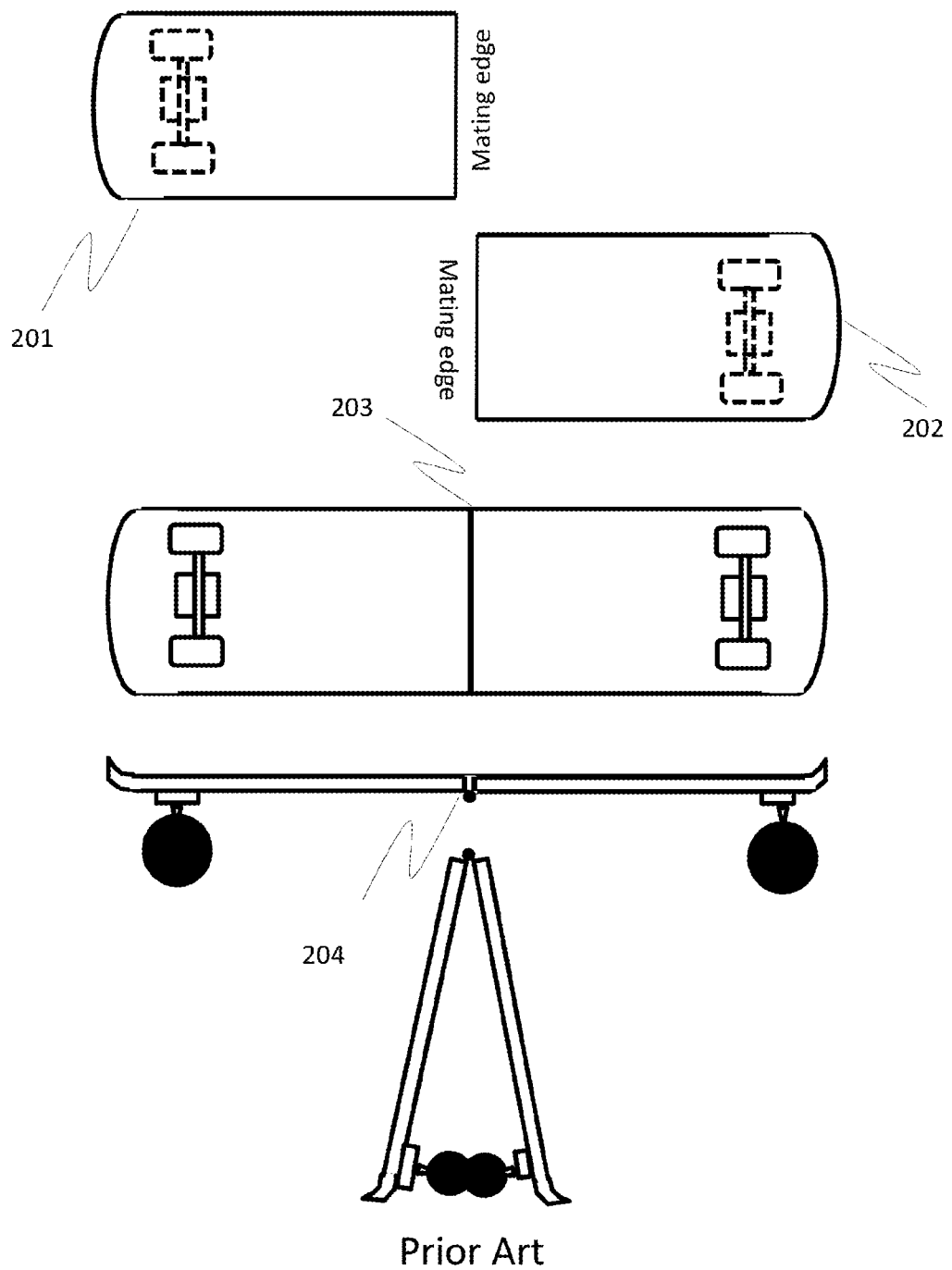
FIG. 2 depicts a bi-folding skateboard. This is prior art

One innovation to skateboard structures has been the ability to fold the deck. FIG. 2 illustrates an exemplary bi-folding skateboard. As shown, the formerly unitary deck is now comprised of two deck portions (201 and 202). Using a pivot and pivot pin subsystem, one can mate the two portions along their respective mating edges (203) such that when fully extended, the two portions are essentially coplanar, and the respective edges line up with one another to resemble a unitary deck structure. When folded, by pivoting the portions around the pivot pin, the two portions are no longer coplanar, but the length of the skateboard has been essentially reduced by half. A tri-folding skateboard (not shown) would have the deck divided into three portions using two pairs of mating edges and pivot subsystems to fold the deck into three parts. Folding skateboards were primarily invented to make stowage and transportation more convenient.

More recently, skateboards have become more popular as a means of personal transportation. For example, it is common to see students skateboarding from home to school or to a mass-transit bus stop. In the latter case, the skateboard is used for part of the journey and the mass-transit vehicle is used for part of the journey. While riding on the mass-transit vehicle, the skateboard user typically holds the skateboard with one arm and hand against his/her side. The 10 pound weight and nearly 36-inch length makes the skateboard cumbersome for the user and potentially a nuisance for other passengers. Placing the skateboard on the floor is a problem because it will roll as the vehicle starts and stops.

A prior art folding skateboard would seem an improvement over the unitary deck skateboard when used for transportation. It can be folded, for example, taking up less space. However, the folding structure and method of prior art skateboards are such that multiple actuators must be manipulated by hands and fingers. In the haste to board a bus, for example, a user may accidently get a hand or finger caught in the folding mechanism and be injured.

FIG. 3A illustrates one embodiment of the system invention. If differs from a prior art bi-fold skateboard in that one set of wheels and wheel mounting structures have been moved closer to its nearest edge (301). This will enable the wheels to rest adjacent to one another, when folded, rather than hitting against one another and preventing further closure of the folded position. In addition, the embodiment system structure has a handle (304) that is operative to fit in a grooved indentation in the top surface such that it is flush with that top surface when the skateboard is fully extended. When folded, the handle (307) now extends beyond the mating edge of the portion to which it is mounted, providing a carry handle for the user. An end fulcrum structure (306) extends below the deck conforming to the curvature of the rear end. This will become a fulcrum during the folding process. A locking mechanism (303) is operative to lock the butt hinge (302) into its position when the deck portions are fully extended and coplanar. As shown in FIG. 3A, the butt-hinge leaves (308) are parallel and vertically oriented. As shown in FIG. 8, the butt-hinge leaves (801) interface with one another and rotate around a pin (802). Note, too, that the pin of the butt hinge sits well below the bottom surface of the deck so that when folded, the two portions are essentially parallel. An unlocking actuator subsystem (305) extends from the locking mechanism (303) to the rear end of the rear deck portion. The actuator is operative to unlock the locking mechanism when it makes firm contact with the ground. It may alternatively be operative to unlock the locking mechanism when pressure is applied to it by the user. Other means of unlocking this mechanism may also be implemented. FIG. 3B shows an alternative handle structure (side view 308, front view 309) and a keyway in one deck portion that allows the handle to move from a position below the deck when unfolded to a position at the top of the folded skateboard when fully folded. Its curvilinear shaft would produce both vertical and horizontal force vectors when pressed vertically downward. That would facilitate the separation of the deck portions during unfolding.

FIG. 4 shows the exemplary embodiment of FIG. 3A from a top and bottom view. FIG. 4 view shows the handle (401) attached to the front deck portion and nested in the grooved indentation of the rear deck portion. The quarter-round end fulcrum structure is shown in its position at the rear end. A unitary quarter-round structure is shown in FIG. 4 view a (404). The actuator subsystem (402) is shown extending from the locking mechanism to the rear end. It is oriented parallel to the deck surfaces, and below the wheel mounting structure but above the wheel surfaces that make contact with the ground. In FIG. 4 view b, an alternative structure of the quarter-round subsystem is shown. Instead of a unitary structure, it comprises two quarter-round structures located at the rear end and vertically aligned with their respective side edges. Note that the quarter-round structure may be implemented using more than a unitary piece or two pieces. Note, also, that the quarter-round structure is one way of shifting the fulcrum from the rear wheels to a point closer to the rear end. Any structure that is operative to shift the fulcrum from the rear wheels to a point closer to the rear end would be applicable. For the purposes of definition, any structure that permits shifting of the fulcrum position from the wheels to a point closer to an end is hereby denoted as "an end fulcrum structure." Furthermore, the unlocking actuator can be located anywhere such that it will unlock the butt hinge when the actuator makes firm contact with the ground surface or, alternatively, when pressure is applied to it by the user.

FIG. 5 illustrates the folding procedure. Pressure is firmly applied near the rear end (501) pushing the end down toward the ground surface. This is typically but not necessarily done using one's foot. This causes the fully extended deck to pivot so that the front end raises most. The pivot fulcrum at this point is the rear wheel axle (502). As the foot, for example, continues to press down, the fulcrum point shifts to the end fulcrum structure (503) causing the rear wheels to pivot upward off the ground surface. Essentially concurrently, the unlocking actuator subsystem (504) now firmly in contact with the ground surface unlocks the deck portion butt hinge such that the front end deck portion now pivots downward toward the ground surface. Alternatively, a user may initiate unlocking by applying pressure to an unlocking actuator. Note that in this folding procedure, a user's hands and fingers are not involved. Only a foot pressed at the rear end area initiates the folding process. Note, further, that the front end can used as an alternative to the rear end if the rear wheels are moved closer to the rear end, the end fulcrum structure is located at the front end, and the unlocking actuator is located such that it contacts the ground when pressure is applied to the front end, or when pressure is applied to the unlocking actuator by the user.

Further elucidation of the folding process is illustrated in FIG. 6. The foot pressing on the area 601 causes the fully extended deck to pivot upward around the rear wheel axles (shown in FIG. 5), when the unlocking actuator subsystem firmly contacts the ground surface (602) it unlocks the locking mechanism 603 allowing the rear end deck portion to continue pivoting upward as the front end deck portion, now released, pivots downward due to gravity. Alternatively, the unlocking mechanism could be unlocked by pressure applied to an unlocking actuator. Note also that the handle is no longer flush with the top surfaces of the deck portions (604). Note also that the wheels of the front end deck portion will make contact with the ground. As the foot continues to press downward, the front end deck portions, due to momentum and inertia, continues to close in toward the rear end deck portion. Once the wheels press against the opposing bottom surfaces, the folding motion ceases. A user can now lift the folded skateboard via the exposed handle and carry it, or stow it in a backpack. The folding process can also be done by applying pressure to the front end rather than the rear end if the rear wheels are moved closer to the rear end, the end fulcrum structure is located at the front end, and the unlocking actuator is positioned such that it makes contact with ground when pressure is applied to the front end, or when pressure is applied to the unlocking actuator by the user.

The unfolding of the folded skateboard begins by first lowering the skateboard via its handle (701) onto the ground surface. Placing one's toe portion of a shoe between the folded portions near the ground, with the foot turned so that the sole is parallel to one of the bottom surfaces, one rotates the foot so that the sole is now parallel to the ground surface and in so doing separates the two folded deck portions near the bottom (702). Placing a foot on the handle and pressing downward and toward the rear end deck portion, the two deck portions begin rolling away from one another and the skateboard collapses into its fully extended position. The locking mechanism will again lock the butt hinge when the two deck portions are essentially coplanar. This will rigidly lock them into that position. Alternatively, one can unfold the skateboard by applying pressure to the handle (701) in a direction downward and toward the opposite deck portion. This will force the deck portion ends to move away from one another and allow the deck portions to collapse in the fully extended and locked position.

A torsion spring-like mechanism may also be incorporated in the butt hinge operative to slow down the speed of folding or unfolding, or to place the deck portions during folding or unfolding into a mid-range folded or unfolded position, with hinge leaves essentially oriented 90 degrees from one another. In such embodiments, further folding or unfolding is prompted by either pulling up on the handle (e.g. for folding) or pushing down on the handle (e.g. unfolding). This alternative embodiment would also serve to protect users from pinched extremities because the hinge does not allow the deck portions to fully unfold in one motion.

Note that the embodiment shown in the figures is meant to be exemplary. The locking mechanism and unlocking actuating subsystem can be implemented in several ways known in the art. The locking mechanism and unlocking actuating subsystem can be operative to automatically unlock the hinge when the unlocking actuator makes firm contact with the ground surface, or when the unlocking actuator is separately manipulated by the user. The essential characteristic is that the locking mechanism remain locked when the unlocking actuator is not making contact with the ground surface, or when no manipulation or pressure is being exerted on it by the user. Similarly, the end fulcrum structure subsystem may be implemented in a unitary, binary, or multiple piece fashion. The handle, as described, could be flush with the top surface of the deck portions, or, alternatively, it could reside under the deck, parallel to it when fully extended, and become exposed by passing through a keyway cut into deck portions for that purpose. Again, the key characteristic is that a handle structure will not extend above the top surface of the fully extended deck portions, but that it becomes exposed and usable as a carry handle once the deck portions are folded.

The folding skateboard hereby disclosed and claimed obviates the need to use hands and fingers for folding or unfolding. However, the mating edges of the deck portions do present a possibility of pinched fingers. Protective elements could be incorporated at the mating edges so as to warn a user of impending closure. For example, a rubber bumper could provide a soft surface that provides a warning to a user that the edges are closing, allowing sufficient time to react.

Although the decks of most skateboards are made of layered wood, the deck could also be fabricated using other materials. The key characteristic is that the deck provides the rigidity and integrity required to safely propel and navigate the skateboard.

The embodiment disclosed and claimed is meant to be exemplary. It should not be read as limiting the scope of the application to those exemplary views and descriptions.

What is claimed is:

1. A hands-free folding skateboard comprising: a rear end deck portion having two opposing side edges, opposing top and bottom surfaces, a rear end, a mating edge essentially opposite to and parallel to said rear end, and a plurality of wheels and wheel-mounting structure mounted to said bottom surface, near said rear end, essentially halfway between said rear end deck portion side edges with said wheel orientation vertical and parallel to said rear end deck portion side edges; a front end deck portion having two opposing side edges, opposing top and bottom surfaces, a front end, a mating edge essentially opposite to and parallel to said front end, and a plurality of wheels and wheel-mounting structure mounted to said bottom surface, near said front end, essentially halfway between said front end deck portion side edges with said wheel orientation vertical and parallel to said front end deck portion side edges; a butt hinge operative to join said mating edges such that when the butt hinge leaves are essentially parallel to one another, said mating edges are held rigidly together, and said top and bottom surfaces of said rear end deck portion and front end deck portion are essentially respectively coplanar and aligned with their respective said side edges; said butt hinge operative to join said mating edges such that when said butt hinge leaves are essentially coplanar with one another, said rear end deck portion is essentially parallel to said front end deck portion; and said wheels mounted to said bottom surface of said rear end deck portion make contact with said bottom surface of said front end deck portion; and said wheels mounted to said bottom surface of said front end deck portion make contact with said bottom surface of said rear end deck portion a butt-hinge locking mechanism operative to lock said butt hinge into a position where said butt-hinge leaves are essentially parallel to one another: an unlocking actuator, operative to unlock said butt-hinge locking mechanism, wherein said unlocking actuator unlocks said butt-hinge locking mechanism when said unlocking actuator makes firm contact with said ground surface, receiving a compressive force thereby.

2. A claim as in claim 1 further comprising:
an end fulcrum structure located below said rear end and oriented so as to become a fulcrum when pressure is applied to said rear end forcing it toward the ground surface.

3. A claim as in claim 1 further comprising:
An end fulcrum structure located below said front end and oriented so as to become a fulcrum when pressure is applied to said front end forcing it toward the ground surface.

4. A claim as in claim 1 further comprising:
a handle firmly affixed to one of said deck portions, extending toward the other said deck portion, located midway between said side edges, and flush with said top surfaces of both of said deck portions when said butt-hinge leaves are essentially parallel and said top surfaces are essentially coplanar;
said handle remains parallel to and firmly affixed to one of said deck portions such that it extends vertically upward from said mating edge when said butt-hinge leaves are coplanar and said front end and said rear end deck portions are fully folded with said front end and said rear end resting on said ground surface.

5. A claim as in claim 1 further comprising:
a curvilinear shafted handle affixed to one said deck portion, extending toward the other said deck portion, located midway between said edges, and positioned below said other deck portion when said skateboard is fully unfolded
said curvilinear shafted handle passes through a keyway in said other deck portion when said skateboard is folded, and extends upward when said butt-hinge leaves are coplanar and said front end and said read end deck portions are fully folded with said front end and said rear end resting on said ground surface.

6. A claim as in claim 1 further comprising:
a torsion controlling subsystem operative to oppose the rotation of said deck portions during folding and unfolding thereby reducing the speed of rotation of said deck portions.

7. A claim as in claim 1 further comprising:
said torsion controlling subsystem operative to oppose said rotation of said deck portions during folding and unfolding and limiting the rotation of said deck portions to a position essentially midway between fully unfolded and fully folded.

* * * * *